Jan. 7, 1964   J. N. MRGUDICH   3,117,035
SOLID ELECTROLYTE CELL
Filed Feb. 20, 1961
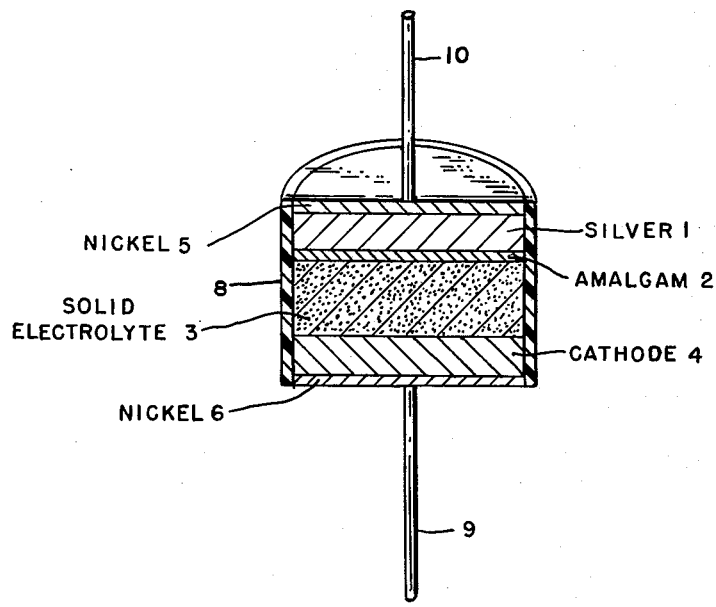
*INVENTOR,*
JOHN N. MRGUDICH
BY *Jack H. Linscott*
ATTORNEY.

United States Patent Office 3,117,035
Patented Jan. 7, 1964

3,117,035
SOLID ELECTROLYTE CELL
John N. Mrgudich, Long Branch, N.J., assignor to the United States of America as represented by the Secretary of the Army
Filed Feb. 20, 1961, Ser. No. 90,608
2 Claims. (Cl. 136—153)
(Granted under Title 35, U.S. Code (1952), sec. 266)

The invention described herein may be manufactured and used by or for the Government for governmental purposes without the payment of any royalty thereon.

This invention relates to solid electrolyte primary cells and more particularly to cells having a metallic electron donor anode and an electron acceptor cathode comprising an oxide of a polyvalent metal in a higher valance state, these electrodes being separated by a solid, ionically conductive, silver halide electrolyte.

Solid electrolyte primary cells possess certain advantages and among these we can find: exceptionally long shelf-life, increased ease of miniaturization, wider range of operational temperature, absence of electrolyte leakage. On the other hand, they can be used only for low current drains due to a combination of low electrolyte conductivity and high polarization losses at both anode and cathode.

In my copending application Serial No. 84,737, filed January 24, 1961, I have described an ionically conductive device consisting of two silver electrodes separated by a solid ionically conductive silver halide in which the deterrent polarization effects are prevented by the use of amalgamated silver electrodes. I now have found that one of the aforementioned disadvantages (anodic polarization) can be substantially eliminated if the metallic electron donor anode is amalgamated, even slightly, in substantially the manner and for the reasons described in my copending application.

The drawing shows in oblique cross-sectional view an illustrative embodiment of the cell according to the invention. This cell comprises a silver anode 1 which has an amalgam layer 2 the thickness of which is exaggerated in the drawing. The depolarizer cathode 4 is composed in known manner of a mixture of vanadium pentoxide, an electronically conductive inert material such as finely dispersed carbon black, and an ionically conductive silver halide as, for instance, silver iodide which makes the depolarizer cathode 4 more ionically conductive. Such a depolarizer cathode mix is, for instance, described in U.S. Patents 2,894,052 and 2,894,053. The two electrodes 1 and 4 are separated by the solid silver iodide electrolyte 3. These cell elements are assembled under pressure to assure intimate contact and are encased in known manner in a plastic sleeve or envelope 8 which may consist of nylon, polystyrene or other plastic insulating materials. End plates 9 and 10 made, for instance, of nickel serve as collector plates carrying the terminals 5 and 6.

The silver electrode 1 may be amalgamated in well known manner by rubbing pure mercury onto the face of the clean and polished silver plate. Other known methods such as vacuum evaporation or condensation of mercury vapor or treatment of the electrode with solutions of appropriate mercury salts or by electro-plating mercury onto the electrodes may, of course, also be used.

The amalgamated silver anode greatly reduces anode polarization by enabling the silver anions to flow more freely from the anode into the solid electrolyte, which of course increases the current flow and results in a significantly better retention of a high initial flash current.

Instead of silver iodide other silver halides such as silver bromide may be used as the solid electrolyte. The vanadium pentoxide in the depolarizer mix may be partly or wholly replaced by other depolarizing oxides as, for instance, manganese dioxides, tungstic oxide, nickel oxide, silver oxide, lead oxide or the like.

It will be obvious to those skilled in the art that many other variations and modifications of materials may be used to construct a cell according to the invention as defined in the appended claims.

What is claimed is:
1. Solid electrolyte primary cells comprising a metallic silver anode, a depolarizer cathode, said electrodes being separated by a solid, ionically conductive silver halide electrolyte characterized in that said metallic silver anode is amalgamated.
2. Solid electrolyte primary cells according to claim 1 in which the anode consists of amalgamated silver, the solid electrolyte of silver iodide and the depolarizer cathode of a mixture of vanadium pentoxide with carbon black and silver iodide.

References Cited in the file of this patent
UNITED STATES PATENTS

| | | |
|---|---|---|
| 313,615 | Platt | Mar. 10, 1885 |
| 1,020,568 | Morrison | Mar. 19, 1912 |
| 2,772,321 | Ensign | Nov. 27, 1956 |
| 2,894,052 | Evans | July 7, 1959 |
| 2,894,053 | Louzos | July 7, 1959 |
| 2,928,890 | Van Der Grinten et al. | Mar. 15, 1960 |